United States Patent

[11] 3,604,140

| [72] | Inventor | Dudley W. Nelson |
| | | Portland, Oreg. |
| [21] | Appl. No. | 796,334 |
| [22] | Filed | Feb. 4, 1969 |
| [45] | Patented | Sept. 14, 1971 |
| [73] | Assignee | Maxwell Manufacturing Co. |
| | | Vancouver, Wash. |

[54] FISH LURE
4 Claims, 5 Drawing Figs.

[52] U.S. Cl. .................................................. 43/42.13,
43/42.19
[51] Int. Cl. ....................................................... A01k 85/00
[50] Field of Search............................................. 43/42.13,
42.14, 42.19, 42.2, 42.12, 42.13, 42.16, 42.17

[56] References Cited
UNITED STATES PATENTS

| 869,565 | 10/1907 | Haverly ......................... | 43/42.2 |
| 1,002,785 | 9/1911 | Telford.......................... | 43/42.2 |
| 167,784 | 9/1875 | Pierce ........................... | 43/42.14 X |
| 418,200 | 12/1889 | Loftie............................ | 43/42.14 |
| 713,435 | 11/1902 | Hildebrandt ................. | 43/42.19 |
| 2,516,434 | 7/1950 | Swan............................. | 43/42.14 |

FOREIGN PATENTS

| 544,152 | 7/1957 | Canada ......................... | 43/42.19 |
| 198,571 | 6/1923 | Great Britain................ | 43/42.2 |

*Primary Examiner*—Samuel Koren
*Assistant Examiner*—Daniel J. Leach
*Attorney*—Eugene M. Eckelman ABSTRACT: A fish lure having supporting shaft portion with an eye at one end for connection to a fishline and an eye at its other end for connection to a hook. Rotatably mounted on the shaft is a sleeve to which are connected multiple flasher blades. All the flasher blades are connected to the sleeve or to the shaft through openings in the sleeve so that as the lure is trolled through the water the said blades and sleeve rotate in unison. In one embodiment, the sleeve comprises a one-piece, full-length member and in another embodiment, the sleeve is segmented to facilitate assembly of the lure.

PATENTED SEP 14 1971 3,604,140
FIG. 1
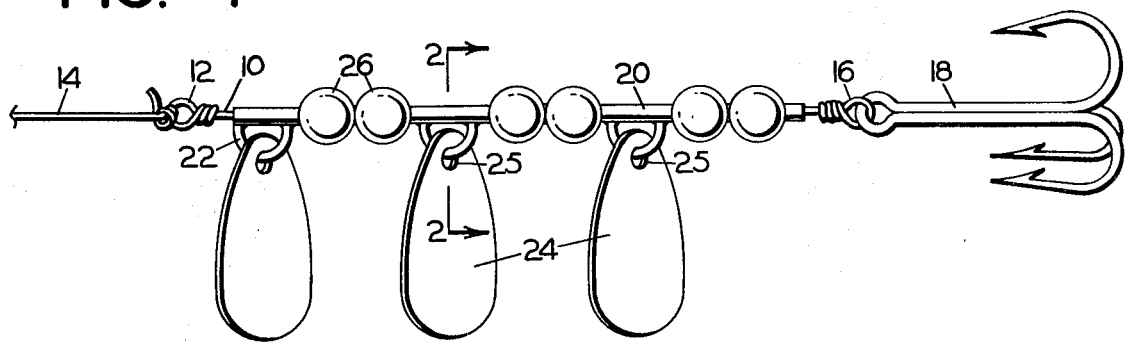
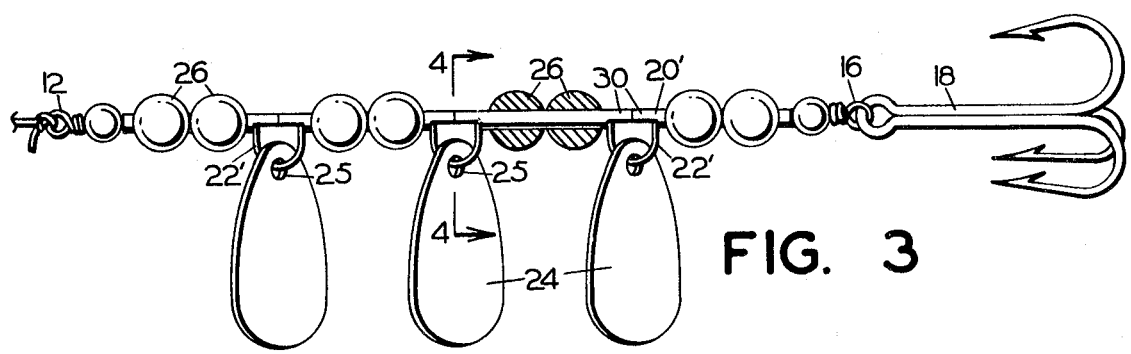
FIG. 3
FIG. 2
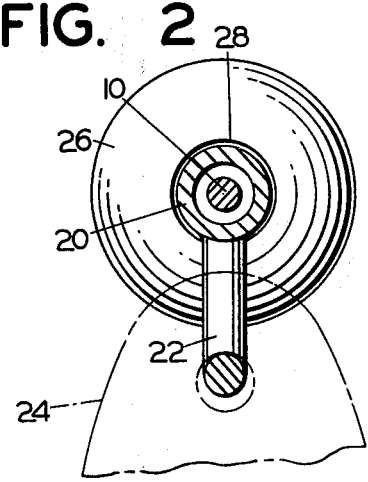
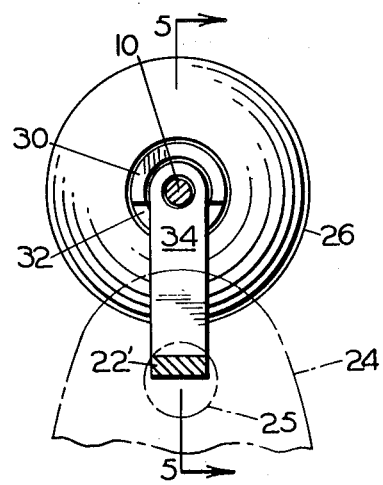
FIG. 4
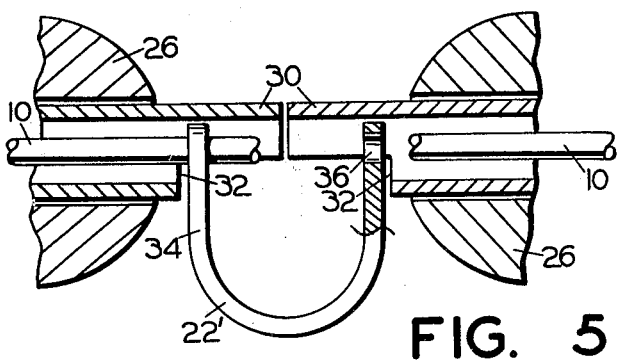
FIG. 5
DUDLEY W. NELSON
INVENTOR.
BY Eugene M. Eckelman
ATTY.

FISH LURE

This invention relates to new and useful improvements in fish lures.

A primary objective of the present invention is to provide a fish lure which by means of its novel construction resembles an injured fish when it is trolled slowly through the water.

A more particular object of the present invention is to provide a fish lure of the type described employing multiple flasher blade elements thereon, all connected to a common rotating body, whereby all the blade elements have unitary synchronized rotation around a common shaft.

Still another object is to provide a fish lure of the type described having novel means for attaching flasher blades for unitary synchronized rotation and including one embodiment which employs segmental body facilitating convenient assembly.

The invention will be better understood and additional objects will become apparent from the following description taken in connection with the accompanying drawings which illustrate preferred forms of the device.

In the drawings:

FIG. 1 is a side elevational view of a first embodiment of fish lure embodying features of the present invention;

FIG. 2 is an enlarged fragmentary cross-sectional view taken on the line 2—2 of FIG. 1;

FIG. 3 is an elevational view similar to FIG. 1 but showing a modified structure of the fish lure;

FIG. 4 is an enlarged fragmentary cross-sectional view taken on the line 4—4 of FIG. 3; and FIG. 5 is an enlarged fragmentary sectional view taken on the line 5—5 of FIG. 4.

Referring in particular to the drawings and first to FIGS. 1 and 2 which show a first embodiment, the lure comprises a supporting shaft 10 having an eye 12 at one end for connection to a fishline 14 and an eye 16 at the other end for connection to a fishhook 18. Shaft 10 may be constructed of any suitable rigid or substantially rigid material and preferably comprises wire stock of sufficient gauge and rigidity to support lure elements and of sufficient flexibility to be bent into the end eyes.

Rotatably supported on the shaft 10 is a sleeve 20 which extends substantially the full length of the shaft and which has integral loops or eyes 22 projecting laterally for supporting spinner blades 24 by means of holes 25 adjacent one end of the latter. Loops 22 are longitudinally aligned along the sleeve 20 and comprise at least two in number. As illustrated, three flasher blades are provided but more yet may be provided if desired. The loops 22 extend longitudinally of the sleeve, or in other words, the openings of such loops extend laterally and the blades 24 thus normally hang generally laterally. However, the mounting holes 25 in the blades are enlarged relative to the cross-sectional dimension of the loops 22 and are thus adapted to tilt at an angle or diagonally between a longitudinal and lateral position. Therefore, upon forward movement of the lure through the water the blades 24 impart a rotative action and will rotate in unison with the sleeve. The lure when so rotated resembles the body action of an injured fish which, as is well known, amounts to a great attraction for other fish.

Beads 26 having apertures 28, FIG. 2, are supported on the sleeve between the loops 22 to fill such area therebetween.

FIGS. 3, 4 and 5 show a second embodiment of the invention. This embodiment similarly has a shaft 10 on which is supported a sleeve 20' having loops or eyes 22' for supporting spinner blades 24. In this embodiment, the sleeve 20' is made up of a plurality of individual segments 30 which have end abutment in their support on the shaft. The segments 30 at their abutting ends have notches 32 which extend through one side, as best seen in FIG. 5. The loops 22' are U-shaped, having leg portions 34 provided with longitudinally extending apertures 36 adjacent the ends thereof arranged to freely receive the shaft 10. In the assembly of the lure, a pair of the segments are held in abutting relation with their notches 32 aligned and while holding a loop 22' in the area of the notches, one end of the shaft 10 is inserted through the apertures 36 in the loop 22'. This ties the loop 22' to the segments, and by employing a plurality of the segments and loops, multiple blades 24 can be supported on the lure. After the lure is assembled, the end eyes 12 and 16 can be formed therein. The embodiment of FIG. 3 also employs beads 26 to fill the area between the loops 22'.

According to the invention, a fish lure is provided which produces the novel action of simulating a small injured fish. The action of the lure will of course depend upon the speed at which it is trolled through the water. Although the lure will resemble a bait fish when trolled relatively fast, it is preferred that it be trolled at a slow speed so that the spinner blades will rotatably flop around with the sleeve to simulate an injured fish.

It is to be understood that the forms of my invention herein shown and described are to be taken as preferred examples of the same and that various other changes in the shape, size and arrangement of parts may be resorted to without departing from the spirit of my invention.

Having thus described my invention, I claim:

1. A fish lure arranged to simulate a bait fish comprising
   a. a shaft having end means arranged to be connected to a fishline and a fishhook,
   b. a sleeve rotatably supported on said shaft and having an outer surface,
   c. at least two loop-connectors mounted on said lure,
   d. said loop-connectors being aligned with each other in spaced relation substantially longitudinally along said lure,
   e. and a spinner blade freely swingable on each of said loop connectors,
   f. said loop connectors being connected to said sleeve in a manner so as to be rotatable with said sleeve on said shaft whereby said spinner blades upon forward movement of the lure through the water rotate as a unit around the shaft while maintaining longitudinal alignment to simulate a bait fish.

2. The fish lure of claim 1 wherein said sleeve extends substantially the full length of said shaft and said connectors extend integrally from said sleeve in a radial direction.

3. The fish lure of claim 1 wherein said sleeve has a notch therein for each connector and said loop-connectors have end portions provided with apertures, said end portions of the loop-connectors extending through said notches and having pivotal engagement by means of said apertures with said shaft whereby said connectors can pivot on said shaft and rotate as a unit with said sleeve.

4. A fish lure arranged to simulate a bait fish comprising
   a. a shaft having end means arranged to be connected to a fishline and a fishhook,
   b. a sleeve rotatably supported on said shaft and having an outer surface,
   c. at least two loop-connectors mounted on said lure;
   d. said loop-connectors being aligned with each other in spaced relation substantially longitudinally along said lure,
   e. said sleeve being comprised of a plurality of longitudinally aligned individual sleeve segments having longitudinally aligned opposed end notches and said loop-connectors extending in said end-opposed notches and being suspended in place by said shaft extending loosely through openings in said loop connections and
   f. a spinner blade on each of said loop-connectors,
   g. said loop-connectors being connected to said sleeve by said notches in a manner so as to be rotatable with said sleeve on said shaft whereby said spinners upon forward movement of the lure through the water rotate as a unit around the shaft while maintaining longitudinal alignment to simulate a bait fish.